(12) United States Patent
Lim et al.

(10) Patent No.: US 9,788,000 B2
(45) Date of Patent: Oct. 10, 2017

(54) METHOD AND APPARATUS FOR INTER COLOR COMPONENT PREDICTION

(71) Applicant: Electronics and Telecommunications Research Institute, Daejeon (KR)

(72) Inventors: Sung Chang Lim, Daejeon (KR); Se Yoon Jeong, Daejeon (KR); Jong Ho Kim, Daejeon (KR); Hui Yong Kim, Daejeon (KR); Dae Yeol Lee, Daejeon (KR); Suk Hee Cho, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 163 days.

(21) Appl. No.: 14/525,626

(22) Filed: Oct. 28, 2014

(65) Prior Publication Data
US 2015/0117521 A1    Apr. 30, 2015

(30) Foreign Application Priority Data

Oct. 28, 2013   (KR) .................. 10-2013-0128685
Oct. 17, 2014   (KR) .................. 10-2014-0141035

(51) Int. Cl.
*H04N 19/186* (2014.01)
*H04N 19/176* (2014.01)
*H04N 19/61* (2014.01)
*H04N 19/159* (2014.01)

(52) U.S. Cl.
CPC ......... *H04N 19/186* (2014.11); *H04N 19/159* (2014.11); *H04N 19/176* (2014.11); *H04N 19/61* (2014.11)

(58) Field of Classification Search
CPC .... H04N 19/159; H04N 19/61; H04N 19/176; H04N 19/186
USPC ..................................... 375/240.03
See application file for complete search history.

(56) References Cited

U.S. PATENT DOCUMENTS

| 2008/0085058 A1* | 4/2008 | Cai ........... H04N 19/13 382/247 |
| 2015/0016512 A1* | 1/2015 | Pu ........... H04N 19/176 375/240.03 |

* cited by examiner

*Primary Examiner* — Zhihan Zhou
(74) *Attorney, Agent, or Firm* — William Park & Associates Ltd.

(57) ABSTRACT

The present invention provides an image encoding apparatus carrying out inter-color prediction, comprising a residual block acquisition module obtaining a residual block with respect to a first color component and a residual block with respect to a second color component from a difference between an input block and a prediction block; an inter-color component prediction module carrying out inter-color component prediction by generating a residual signal reflecting a difference between a residual block with respect to the first color component and a residual block with respect to the second color component; a transform module generating a transformat coefficient by carrying out transformation with respect to the residual signal; a quantization module generating quantized data by carrying out quantization with respect to the transform coefficient; and an entropy encoding module carrying out entropy encoding by removing statistical redundancy of the quantized data.

2 Claims, 11 Drawing Sheets

METHOD AND APPARATUS FOR INTER COLOR COMPONENT PREDICTION

CROSS-REFERENCE TO RELATED APPLICATION

This application claims priority to Korean Patent Application No. 10-2013-0128685 filed on Oct. 28, 2013 and Korean Patent Application No. 10-2014-0141035 filed on Oct. 17, 2014, the contents of which are herein incorporated by reference in its entirety.

BACKGROUND OF THE INVENTION

Field of the Invention

The present invention is related to a method for encoding/decoding images and an apparatus using the method; and more particularly, a method for encoding/decoding images employing inter-color component prediction and an apparatus using the method.

Discussion of the Related Art

The continuous expansion of information and communication industry has caused worldwide spread of High Definition (HD) broadcasting services. Now many users have become accustomed to high resolution, high quality images, and a large number of organizations are speeding up development of the next-generation display devices to meet the demand of the public for high quality broadcasting services. Besides the HDTV, as people are paying great attention to Full HD (FHD) and Ultra High Definition (UHD) TV providing an image resolution four or more times the resolution of HDTV, an image encoding/decoding technology for images with higher resolution and higher quality is needed more than ever.

To carry out encoding/decoding images of higher resolution and quality, a method and an apparatus for encoding/decoding images can employ an inter-prediction technique predicting pixel values of a current picture from temporarily preceding and/or succeeding pictures; an intra-prediction technique predicting pixel values of a current picture by using pixel information of the current picture; and an entropy encoding technique allocating a short code to the symbol with a high frequency and a long code to the symbol with a low frequency.

However, a method and an apparatus for encoding/decoding images in the prior art does not take into account the correlation between inter-color components, and accordingly, the conventional method and apparatus for image encoding/decoding caused degradation of image encoding/decoding efficiency.

SUMMARY OF THE INVENTION

An object of the present invention is to provide an apparatus and a method for improving an image encoding/decoding efficiency by taking into account a correlation between color components.

Another object of the present invention is to provide an apparatus and a method for improving an image encoding efficiency by selectively performing inter-color prediction.

A yet another object of the present invention is to provide an apparatus and a method for an image decoding efficiency by selectively performing inter-color compensation.

According to one embodiment of the present invention, an image encoding apparatus carrying out inter-color prediction comprises a residual block acquisition module obtaining a residual block with respect to a first color component from a difference between an input block and a prediction block with the first color component and obtaining a residual block with respect to a second color component from a difference between an input block and a prediction block of the second color component; an inter-color component prediction module generating a residual signal reflecting a difference between a residual block with respect to the first color component and a residual block with respect to the second color component; a transform module generating a transform coefficient by carrying out transformation with respect to the residual signal; a quantization module generating quantized data by carrying out quantization with respect to the transform coefficient; and an entropy encoding module generating bitstream by entropy encoding for the quantized data.

The inter-color prediction module generates the residual signal if a predetermined condition is satisfied.

The predetermined condition requires that a transform unit is larger than a predetermined size.

The predetermined condition requires that a transform unit is smaller than a predetermined size.

The entropy encoding module generates an indicator indicating through a Picture Parameter Set (PPS) whether to generate a residual signal.

The first color component is luminance, and the second color component is chrominance.

According to another embodiment of the present invention, an image decoding apparatus carrying out inter-color compensation comprises an entropy decoding module generating quantized data by receiving a bitstream; an dequantization module generating a transform coefficient by carrying out dequantization with respect to the quantized data; an inverse transform module generating a residual signal by carrying out inverse transform with respect to the transform coefficient; an inter-color component compensation module generating a residual block with respect to a second color component by adding a residual signal to a residual block associated with a first color component; and a reconstructed block acquisition module obtaining a reconstructed block by adding a prediction block with respect to a first color component to a residual block associated with the first color component and adding a prediction block with respect to a second color component to a residual block associated with the second color component.

The inter-color component compensation module generates a residual block with respect to a second color component by adding a residual signal to a residual block of the first color component if a predetermined condition is satisfied.

The predetermined condition requires that a transform unit is larger than a predetermined size.

The predetermined condition requires that a transform unit is smaller than a predetermined size.

The entropy decoding module is commanded through a Picture Parameter Set (PPS) to generate a residual block with respect to a second color component by adding a residual signal to a residual block of the first color component.

The first color component is luminance, and the second color component is chrominance.

According to a yet another embodiment of the present invention, an image decoding method carrying out inter-color component compensation comprises entropy decoding receiving a bitstream and generating quantized data; dequantization generating a transform coefficient from the quantized data; inverse transform generating a residual signal from the transform coefficient; compensating inter-color component generating a residual block with respect to a second color component by adding a residual signal to a residual block of a first color component; and obtaining a reconstructed block obtaining a reconstructed block by adding a prediction block with respect to a first color component to a residual block of the first color component and adding a prediction block with respect to a second color block to a residual block of the second color component.

The inter-color component compensation generates a residual block with respect to a second color component by adding a residual signal to a residual block of the first color component if a predetermined condition is satisfied.

The predetermined condition requires that a transform unit is larger than a predetermined size.

The predetermined condition requires that a transform unit is smaller than a predetermined size.

The entropy decoding is commanded through a Picture Parameter Set (PPS) to generate a residual block with respect to a second color component by adding a residual signal to a residual block of the first color component.

The first color component is luminance, and the second color component is chrominance.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE INVENTION

In what follows, embodiments of the present invention will be described in more detail with reference to appended drawings. In the following description, if it is decided that the detailed description of known function or configuration related to the invention obscures the technical principles of the present invention, the corresponding description is omitted.

Figure 1:
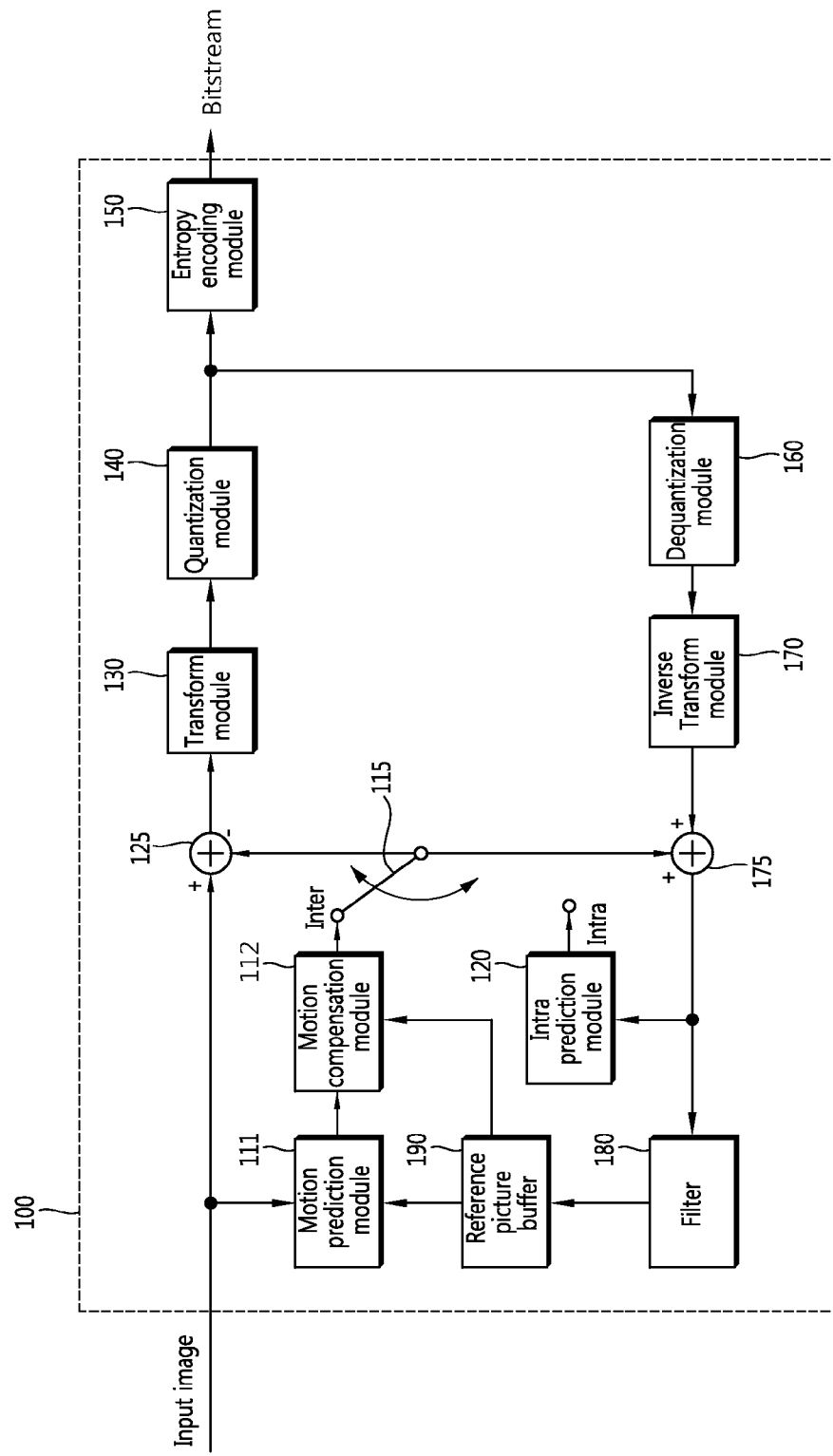
FIG. 1 is a block diagram illustrating a structure of an image encoding apparatus according to one embodiment to which the present invention is applied.

FIG. 1 is a block diagram illustrating a structure of an image encoding apparatus according to one embodiment to which the present invention is applied.

With reference to FIG. 1, the image encoding apparatus 100 comprises a motion prediction module 111, a motion compensation module 112, an intra-prediction module 120, a switch 115, a subtraction unit 125, a transform module 130, a quantization module 140, an entropy encoding module 150, an dequantization module 160, an inverse transform module 170, an adder 175, a filter 180, and a reference picture buffer 190.

The image encoding apparatus 100 can perform encoding and output a bitstream in an intra-mode or an inter mode with respect to an input image. In the case of the intra mode, the switch 115 is switched to intra-prediction, while the switch 115 is switched to inter-prediction in the case of the inter mode. The image encoding apparatus 100, after generating a prediction block with respect to an input block of an input image, encodes a residual signal between the input block and the prediction block.

In the case of the intra mode, the intra-prediction module 120 can use pixels of already encoded blocks adjacent to a current block as reference pixels. The intra-prediction module 120 performs spatial prediction by using the reference pixels and generates prediction samples with respect to the current block.

In the case of the inter-mode, the motion prediction module 111 can determine a motion vector by finding a region best matching the input block from among a reference image stored in a reference picture buffer 190 during a motion prediction process.

The motion compensation module 112 can generate a prediction block by carrying out motion compensation based on the motion vector. At this time, the motion vector is a two-dimensional vector used for inter-prediction and can represent an offset between a target image to be encoded/decoded and a reference image.

The subtraction module 125 can generate a residual block due to a residual signal between an input block and a generated prediction block.

The transform module 130 can perform transformation of the residual block and output transform coefficients. At this time, the transform coefficients correspond to the coefficients generated as the residual block and/or residual signal is transformed. If a transform skip mode is applied, the transform module 130 can skip transformation of the residual block.

In the remainder of this document, quantized transform coefficient levels, which are generated from quantization of the transform coefficients, are also called transform coefficients.

The quantization module 140 can quantize input transform coefficients according to quantization parameters and output quantized transform coefficient levels. At this time, the quantization module 140 can quantize the input transform coefficients by using a quantization matrix.

The entropy encoding module 150 performs entropy encoding on the calculated values from the quantization module 140 or on the encoding parameters calculated during the encoding process according to a probability distribution; and outputs a bitstream. The entropy encoding module 150 can perform entropy encoding on the information for video decoding (for example, syntax element) in addition to video pixel information.

The encoding parameters are needed for encoding and decoding, including not only the information encoded by an encoding apparatus and delivered to a decoding apparatus, such as the syntax element but also the information that can be inferred during the encoding or decoding process.

The encoding parameters can include intra/inter prediction mode, movement/motion vector, reference image index, quantization block pattern, presence of a residual signal, transform coefficients, quantized transform coefficients, quantized parameters, block size, block partition information, and statistical values.

A residual signal may refer to a difference between the original signal and a predicted signal, a signal formed from transformation of a difference between the original signal and a predicted signal, or a signal formed from transformation and quantization of a difference between the original signal and a predicted signal. A residual signal in units of blocks can be called a residual block.

In case entropy encoding is applied, a small number of bits are allocated to the symbol with a high probability of occurrence but a large number of bits are allocated to the symbol with a low probability of occurrence; in this manner, the size of a bit series with respect to the target symbols to be encoded can be reduced. Therefore, compression performance of image encoding can be improved through the entropy encoding.

To implement the entropy encoding, encoding methods such as exponential golomb, Context-Adaptive Variable Length Coding (CAVLC), and Context-Adaptive Binary Arithmetic Coding (CABAC) can be used. For example, the entropy encoding module 150 can perform entropy encoding by using a Variable Length Coding/Code (VLC) table. Also, the entropy encoding module 150, after determining a binarization method of a target symbol and a probability model of a target symbol/bin, can perform entropy encoding by using the determined binarization method or probability model.

The quantized coefficients are inversely quantized in the dequantization module 160 and inversely transformed in the inverse transform module 170. The inversely quantized, transformed coefficients are added to prediction blocks through the adder 175 and then reconstructed blocks are generated.

The reconstructed blocks go through the filter 180, and the filter 180 can apply at least one or more of deblocking filter, Sample Adaptive Offset (SAO) filter, and Adaptive Loop Filter (ALF) on the reconstructed blocks or restoration pictures. The filter 180 may be called an adaptive in-loop filter.

The deblocking filter can remove a block distortion generated in the block boundary. The SAO filter may add an appropriate offset to a pixel value to compensate a coding error. The ALF can perform filtering based on a comparison value between a restored image and the original image. A reconstructed block which has gone through the filter 180 can be stored in the reference picture buffer 190.

Figure 2:
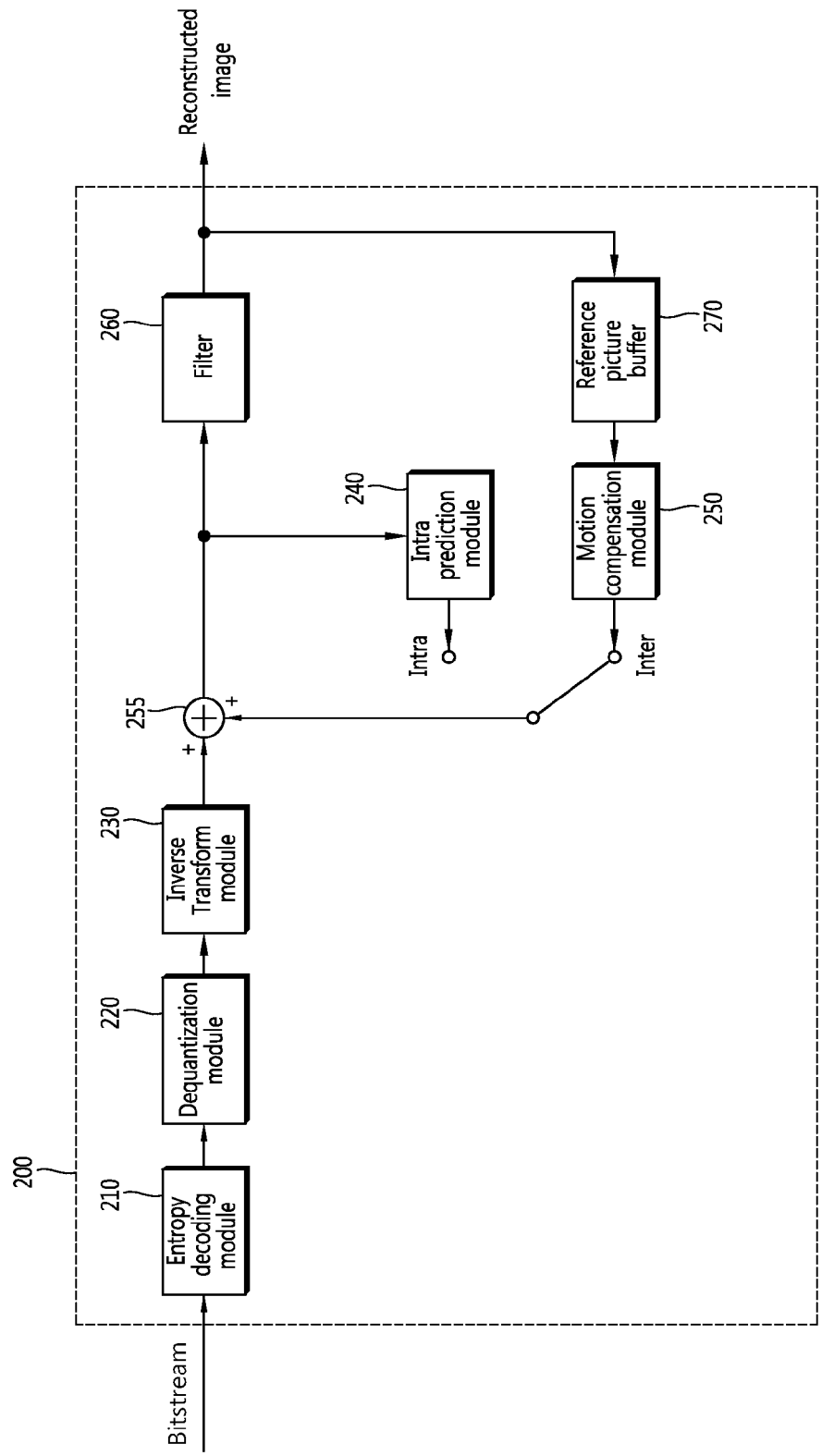
FIG. 2 is a block diagram illustrating a structure of an image decoding apparatus according to one embodiment to which the present invention is applied.

FIG. 2 is a block diagram illustrating a structure of an image decoding apparatus according to one embodiment to which the present invention is applied.

With reference to FIG. 2, the image decoding apparatus 200 comprises an entropy decoding module 210, a dequantization module 220, an inverse transform module 230, an intra-prediction module 240, a motion compensation module 250, an adder 255, a filter 260, and a reference picture buffer 270.

The image decoding apparatus 200 receives a bitstream output from an encoder, performs decoding of the bitstream in an intra or inter mode, and outputs a reconstructed image, namely, a restored image. In the case of the intra mode, the switch can be switched to an intra-prediction, while the switch can be switched to an inter-prediction in the case of the inter mode. The image decoding apparatus 200 obtains a reconstructed residual block from an input bitstream, generates a prediction block, and generates a reconstructed block, namely, a restored block by combining the reconstructed residual block and the prediction block.

The entropy decoding module 210 applies entropy decoding to an input bitstream according to a probability distribution and generates symbols including symbols in the form of quantized coefficients. An entropy decoding method is carried out inversely to the entropy encoding method described above.

The quantized coefficients are inversely quantized in the dequantization module 220, inversely transformed in the inverse transform module 230, and a reconstructed residual block can be generated as a result of dequantization/inverse transform of the quantization coefficients. At this time, the dequantization module 220 can apply a quantization matrix to the quantized coefficients.

In the case of the intra mode, the intra-prediction module 240 can generate a prediction block by performing spatial prediction by using pixels of already decoded blocks adjacent to a current block. In the case of the inter mode, the motion compensation module 250 can generate a prediction block by performing motion compensation by using a motion vector and a reference image stored in the reference picture buffer 270.

The reconstructed residual block is added to the prediction block by the adder 255, and the added block goes through the filter 260. The filter 260 can apply at least one or more of the deblocking filter, SAO filter, and ALF to a reconstructed block or a reconstructed picture. The filter 260 can output a restructured image, namely, a restored image. The restored image can be stored in the reference picture buffer 270 to be used for inter-prediction.

Figure 3:
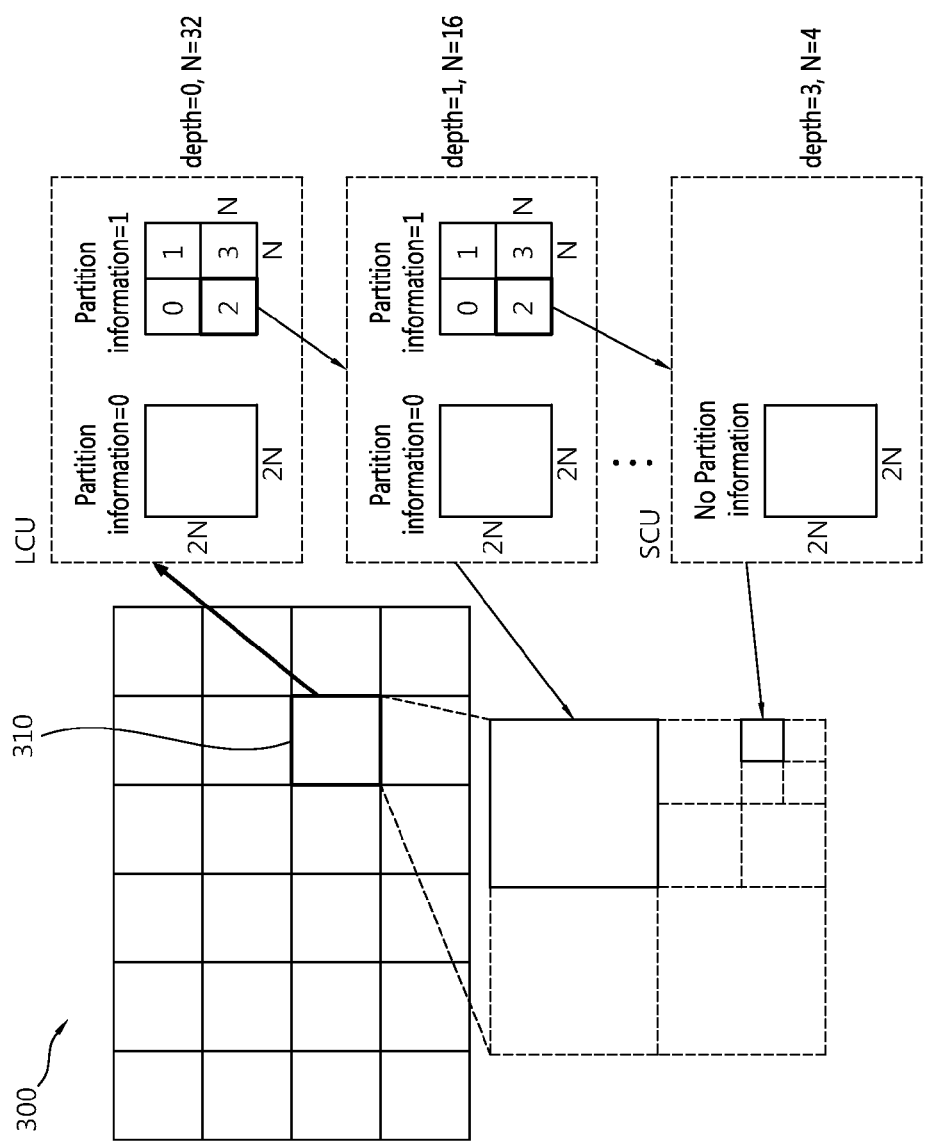
FIG. 3 illustrates a partition structure of an image when the image is encoded or decoded.

FIG. 3 illustrates a partition structure of an image when the image is encoded or decoded.

For efficient partitioning of an image, a Coding Unit (CU) can be used for encoding and decoding. A unit refers to a block comprising a syntax element and image samples. Partitioning of a unit may refer to partitioning of a block corresponding to a unit.

With reference to FIG. 3, an image 300 may be sequentially partitioned in units of Largest Coding Units (LCUs). A partition structure may be determined LCU units. Here, LCU may mean Coding Tree Unit. The partition structure refers to a distribution of Coding Units (CUs) meant for encoding an image efficiently within the LCU 310, and the distribution is determined according to whether to partition a single CU into four CUs, each of which having half the perimeter and a quarter the area of the original CU. Each partitioned CU can be recursively subdivided into four CUs, again each of which having half the perimeter and a quarter the area of the partitioned CU.

At this time, partitioning of a CU can be subdivided recursively down to a predetermined depth. Depth information represents size of a CU and is defined for each CU. For example, depth of an LCU can be 0, while the depth of a Smallest Coding Unit (SCU) can be a predetermined maximum depth. At this time, the LCU is a coding unit having the largest coding unit size as described above, while the SCU is a coding unit having the smallest coding unit size.

Each time subdivision of a CU into four smaller units by dividing the horizontal and vertical length of the current CU by half is carried out from the LCU 310, CU depth is increased by one. For each depth level, a CU without partitioning has a size amounting to 2N×2N, but in the case of a CU partitioned into smaller units, the CU having the size of 2N×2N is subdivided into four smaller CUs, size of which each amounts to N×N. The size of N is decreased by half as the depth is increased by 1.

With reference to FIG. 3, the size of an LCU having the minimum depth of 0 is 64×64 pixels while the size of an SCU having the maximum depth of 3 is 8×8 pixels. In this case, the CU (LCU) of the 64×64 pixels can be represented by depth 0; the CU of the 32×32 pixels by depth 1; the CU of the 16×16 pixels by depth 2; and the CU (SCU) of the 8×8 pixels by depth 3.

Also, information about whether to partition a particular CU can be represented by 1 bit partitioning information for each CU. The partitioning information can be included in all of the CUs except for the SCU; for example, in case a CU is not subdivided, the partitioning information can store 0 while the partitioning information can store 1 in case the CU is partitioned.

Figure 4:
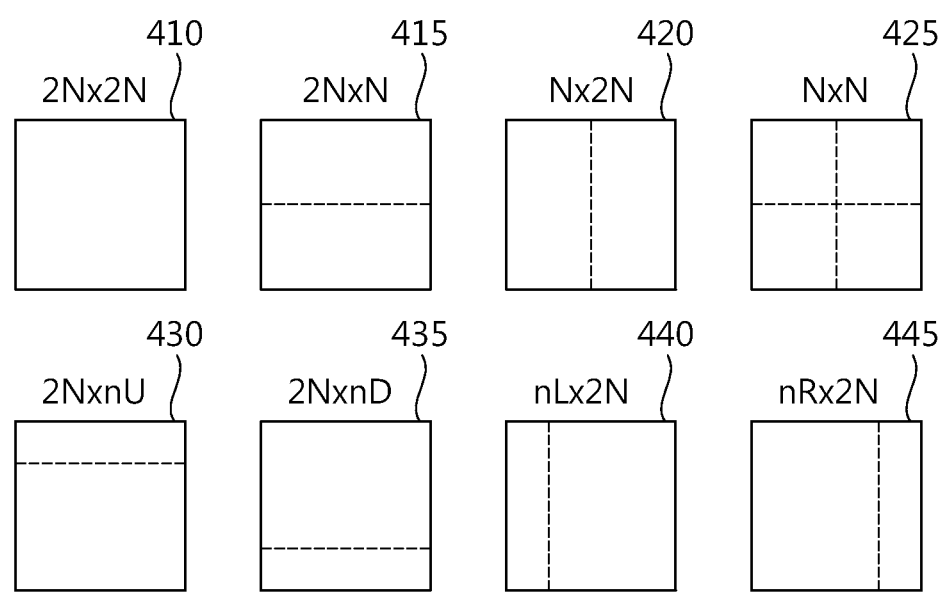
FIG. 4 illustrates types of a Prediction Unit (PU) which a Coding Unit (CU) can include.

FIG. 4 illustrates types of a Prediction Unit (PU) which a Coding Unit (CU) can include.

Among CUs subdivided from the LCU, those CUs not subdivided any further are broken down to one or more prediction units, which is also called partitioning.

A Prediction Unit (PU) is a basic unit intended to perform prediction and encoded and decoded in one of a skip mode, inter mode, and intra mode and can be partitioned in various ways according to the respective modes.

With reference to FIG. 4, the skip mode supports 2N×2N mode 410 having the same size as the CU without incorporating partition within the CU.

The inter mode supports 8 different partitions within the CU, including 2N×2N mode 410, 2N×N mode 415, N×2N mode 420, N×N mode 425, 2N×nU mode 430, 2N×nD mode 435, nL×2N mode 440, and nR×2N mode 445.

The intra mode supports 2N×2N mode 410 and N×N mode 425 within the CU.

Figure 5:
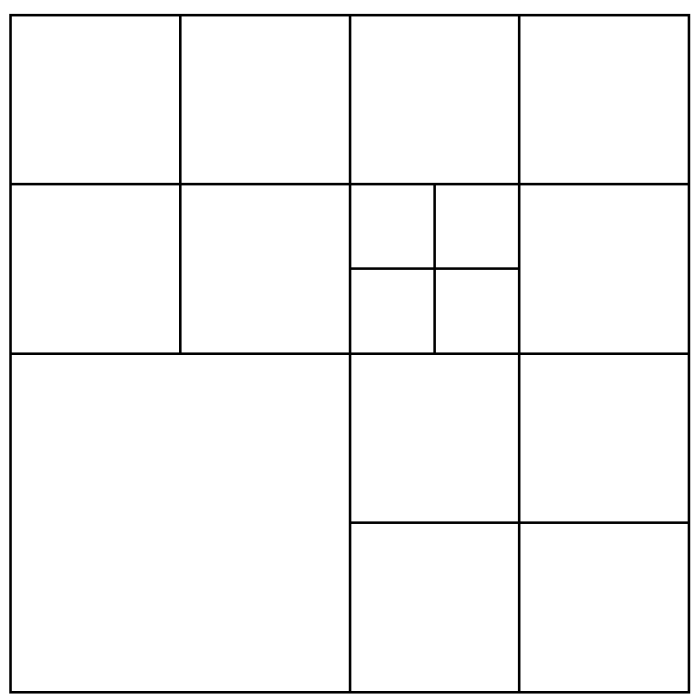
FIG. 5 illustrates types of a Transform Unit (TU) which a Coding Unit (CU) can include.

FIG. 5 illustrates types of a Transform Unit (TU) which a Coding Unit (CU) can include.

A Transform Unit (TU) is a basic unit intended for a transform, quantization, inverse transform, and dequantization process within a CU. A TU can assume a square or a rectangular form. Those CUs not partitioned any further from among the CUs partitioned from an LCU can be subdivided into one or more TUs. At this time, the partition structure of a TU can take a quad-tree structure. For example, as shown in FIG. 5, one CU 510 can be subdivided one or more times according to the quad-tree structure and can be composed of TUs of various sizes.

Figure 6:
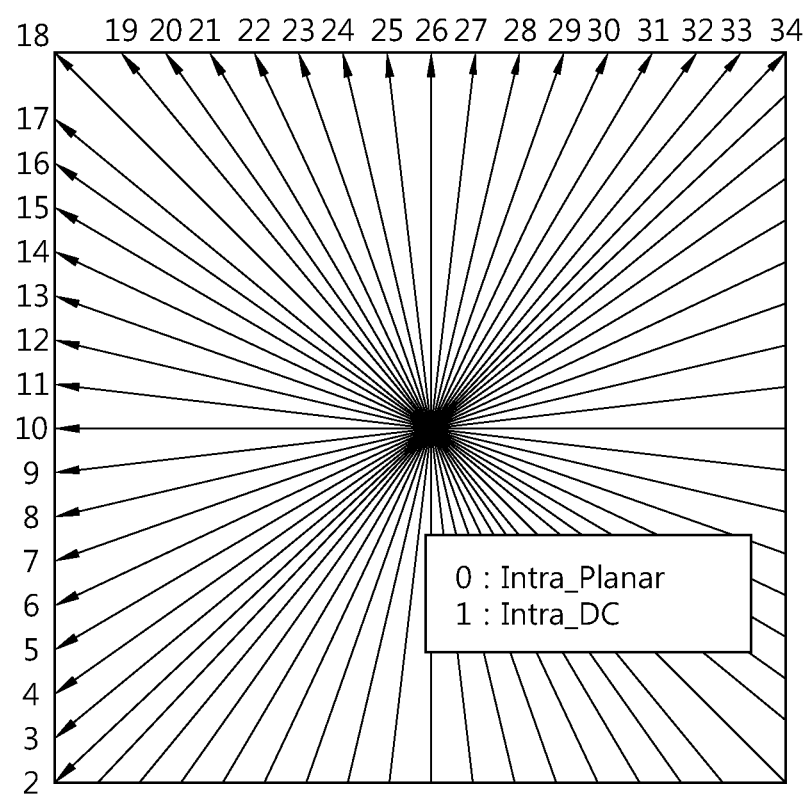
FIG. 6 illustrates an embodiment of an intra-prediction process.

FIG. 6 illustrates an embodiment of an intra-prediction process.

The number of prediction units in the intra-prediction mode can be fixed to 35 irrespective of the sizes of the respective prediction units. At this time, the prediction mode can be composed of two non-directional modes (DC, Planar) and 33 directional modes. At this time, the number of prediction modes can be varied according to whether a color component is a luma signal or a chroma signal. The size of a prediction unit can be 4×4, 8×8, 16×16, 32×32, 64×64, and so on, each forming an N×N or a 2N×2N square. The unit of the PU may be used at least one of the sizes of the Coding Unit (CU), Prediction Unit (PU), and Transform Unit (TU). Intra-encoding/decoding can be carried out by using samples includes in the adjacent restored units or encoding parameters.

Figure 7:
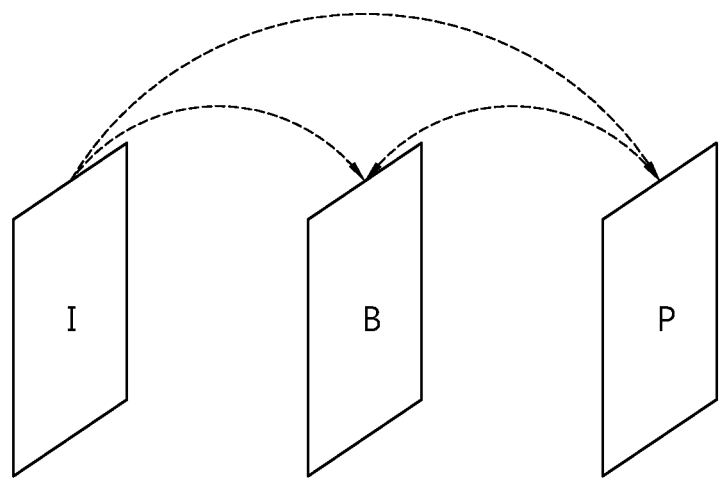
FIG. 7 illustrates an embodiment of an inter-prediction process.

FIG. 7 illustrates an embodiment of an inter-prediction process. The quadrangle of FIG. 7 represents an image (picture). An arrow of FIG. 7 represents a prediction direction. In other words, depending on a prediction direction, an image can be encoded or decoded.

Each image (picture) is classified as an Intra picture (I-picture), a Uni-prediction picture (P-picture), or a Bi-prediction picture (B-picture) according to an encoding type; and can be encoded according to the encoding type of each picture.

An I-picture is coded without inter-picture prediction; a P-picture is encoded by forward inter-prediction from reference pictures; a B-picture is encoded by using both forward and backward inter-prediction from reference pictures or by using one of the forward and backward inter-prediction from reference pictures.

In what follows, inter-prediction will be described in more detail.

Inter-prediction can be carried out from reference pictures and motion information. Also, inter-prediction can employ the aforementioned skip mode.

A previous or next picture of a current picture is used as a reference picture. At this time, inter-prediction can carry out prediction for a block based on the reference picture. In other words, a reference picture may refer to the image used for prediction of a block.

At this time, an area within a reference picture can be represented by a reference picture index (refIdx) indicating the reference picture and a motion vector to be described later. Inter-prediction can generate a prediction block with respect to a current block by selecting a reference picture and a reference block corresponding to the current block within the reference picture.

Motion information can be derived from the inter-prediction through an encoder and a decoder. Also, the derived motion information can be used to carry out inter-prediction.

At this time, the encoder and the decoder can improve encoding/decoding efficiency by using reconstructed neighboring blocks and/or motion information of collocated blocks corresponding to a current block within an already reconstructed collocated picture. Here, the constructed neighboring blocks are the blocks within a current picture reconstructed from previous encoding and/or decoding and include the blocks adjacent to a current block and/or the blocks located at outside corners of the current block.

Also, an encoder and an decoder can determine a predetermined relative position with respect to a block located at a position corresponding spatially to a current block within a collocated picture; and can derive the collocated block based on the predetermined relative position (the position inside and/or outside of a block located at a position corresponding spatially to the current block).

Meanwhile, a method for deriving motion information can be varied according to a prediction mode of a current block. Prediction mode used for inter-prediction may include Advanced Motion Vector Predictor (AMVP), merge, and so on.

As one example, in case the AMVP is applied, an encoder and a decoder can generate a list of prediction motion vector candidates by using a motion vector of reconstructed neighboring blocks and/or a motion vector of a collocated block. In other words, a motion vector of reconstructed neighboring blocks and/or a motion vector of a collocated block can be used as a prediction motion vector candidate.

At this time, the encoder and the decoder can deliver a prediction motion vector index to the decoder, which indicates an optimal prediction motion vector selected from among the prediction motion vector candidates belonging to the list. Here, the decoder can select a prediction motion vector of a current block from among the prediction motion vector candidates belonging to the list of prediction motion vector candidates by using the prediction motion vector index.

Now, the encoder can calculate a Motion Vector Difference (MVD) between a motion vector of a current block and a prediction motion vector and deliver an encoded MVD to the decoder. Here, the decoder can decode a received motion vector difference and derive a motion vector of a current block through summation of the decoded motion vector difference and a prediction motion vector.

The encoder can deliver a reference picture index indicating a reference picture to the decoder. The decoder predicts a motion vector of a current block by using motion information of neighboring blocks and derives a motion vector of a current block by using a motion vector difference received from the encoder. The decoder generates a prediction block with respect to a current block based on the derived motion vector and the reference picture index information received from the encoder.

As another example of a method for deriving motion information, a merge motion can be applied. In case a merge motion is applied, an encoder and a decoder can generate a merge motion candidate list by using motion information of reconstructed neighboring blocks and/or motion information of collocated blocks. At this time, motion information includes information of a motion vector, a reference image and prediction direction (mono-direction, bi-direction etc.).

A merge motion can be applied in units of encoding units or prediction units. In case a merge motion is represented in units of CUs and PUs, there needs to send information as to whether to carry out a merge motion for individual block partitions and information about which block from neighboring blocks adjacent to a current block (for example, left side neighboring block, upper side neighboring block, or temporally neighboring block of a current block) to be used for carrying out a merge motion.

At this time, a merge motion candidate list represents a list storing motion information and is generated before merge motion is carried out. The information stored in the merge motion candidate list may include motion information of neighboring blocks adjacent to a current block or motion information of collocated blocks corresponding to a current block within a reference image. Also, motion information stored in the merge motion candidate list may also include new motion information composed of motion information already belonging to the merge motion candidate list.

The skip mode is one of the modes used for inter-prediction, where information of neighboring information is used directly for a current block. In the case of skip mode, an encoder delivers only the information as to motion information of which block to be used as the motion information of a current block to a decoder, but the encoder does not deliver the information (for example, syntax information such as motion vector difference information) rather than the aforementioned information to the decoder.

As described above, an image encoding/decoding method and an apparatus using the method can use intra/inter prediction, entropy encoding, and so on to improve an image encoding/decoding efficiency. However, since it is not possible to attain a sufficient image encoding/decoding efficiency from the method above, the present invention proposes an additional method for removing correlation between color components.

At this time, color components refer to constituting elements comprising color space, and a color component can be luminance, chrominance, R (Red), G (Green), B (Blue), Y, U, V, Cb, Cr, and so on. In what follows, specifics of embodiments of the present invention will be described based on a method for removing correlation between luminance (Y), and chrominance components (U, V) of the YUV color space and a method for removing correlation among R, G, and B component in the RGB color space.

A method for encoding/decoding and an apparatus using the method according to the present invention can determine correlation among color components and remove those data showing correlation from the color components. According to the present invention, since a method for encoding/decoding and an apparatus using the method can remove those data showing correlation among their color components, encode/decode the remaining data only, an image encoding/decoding efficiency can be improved and in particular, the image encoding/decoding efficiency according to the present invention is maximized in case inter-color correlation is large.

For example, the method and the apparatus above is typically used for the case requiring processing of a large amount of image data for encoding/decoding color components, such as the RGB 4:4:4, YUV 4:4:4, and YUV 4:2:2, which can also be applied to transformation from RGB color space to YUV color space.

At this time, the method for encoding/decoding and the apparatus using the method, after completing encoding/decoding of residual blocks with respect to one color component first of all, carries out encoding/decoding of residual blocks with respect to the remaining color components by using the residual blocks of the color component which have completed an encoding/decoding process.

However, there are times inter-color correlation among color components is not removed sufficiently though the image encoding/decoding is carried out through the method described above. Therefore, in what follows, described will be a method for improving an encoding/decoding efficiency much more by carrying out inter-color prediction selectively according to the block size, prediction mode, and so on and an apparatus using the method.

Figure 8:
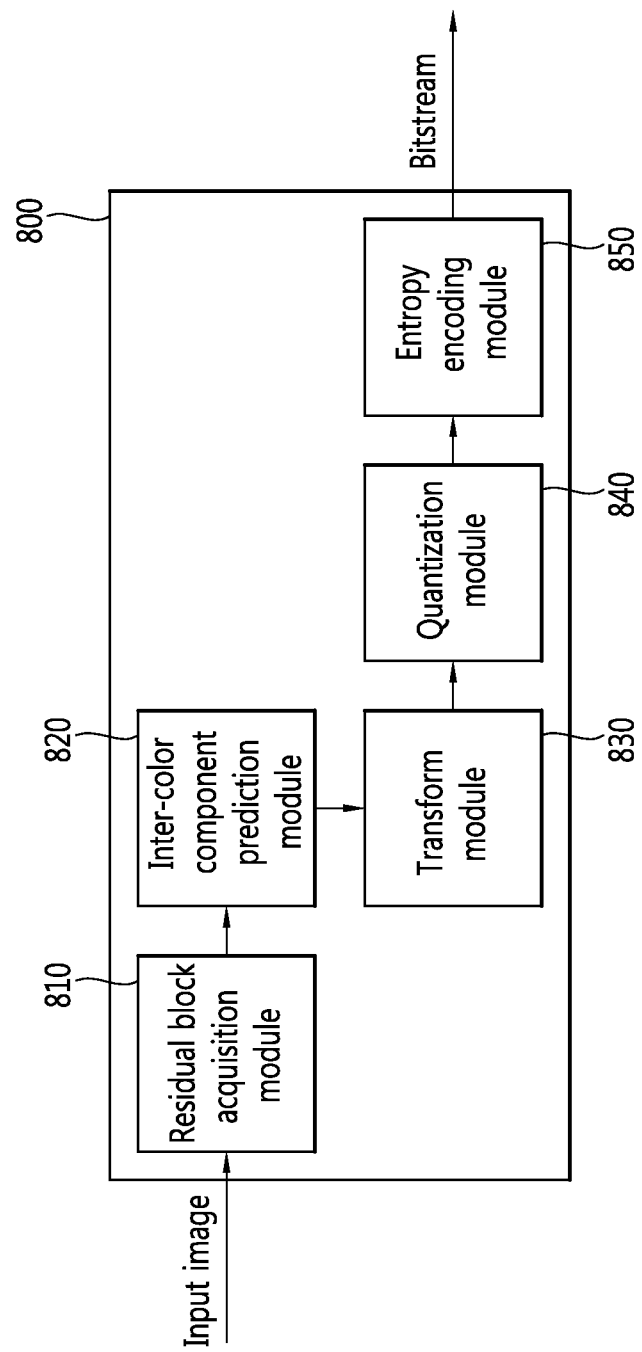
FIG. 8 is a block diagram of an image encoding apparatus which uses inter-color component prediction according to one embodiment of the present invention.

FIG. 8 is a block diagram of an image encoding apparatus which uses inter-color component prediction according to one embodiment of the present invention.

With reference to FIG. 8, an image encoding apparatus 800 using inter-color prediction comprises a residual block acquisition module 810, an inter-color prediction module 820, a transform module 830, a quantization module 840, and an entropy encoding module 850.

An image encoding apparatus 800 using inter-color prediction can refer to the aforementioned image encoding apparatus. Therefore, an image encoding apparatus 800 carrying out inter-color prediction can carry out image encoding based on the intra or inter-mode as described above.

The residual block acquisition module 810 generates residual blocks according to the intra- or inter-mode and obtains residual blocks from the difference between input blocks of an input image and prediction blocks. As described above, since a syntax element and a block can be collectively called a unit, generation of a prediction block can be regarded as generation of a prediction unit, and a specific method for generating a prediction block is the same as described above.

The residual block acquisition module 810 obtains residual blocks with respect to the respective color components through the process above, and a residual block with respect to each color component includes a residual block with respect to a first color component and a residual block with respect to a second color component. As described above, color components include luminance, chrominance, Red, Green, Blue, Y, U, V, Cb, Cr, and others.

According to one embodiment of the present invention, the residual block acquisition module 810 can obtain residual blocks with respect to chrominance component by using a Derived Mode (DM). The DM indicates switching the intra-prediction mode with respect to luminance to intra-prediction mode with respect to chrominance.

According to another embodiment of the present invention, the residual block acquisition module 810 can obtain residual blocks with respect to the chrominance component by using a planar mode, DC mode, horizontal mode, vertical mode, or mode corresponding to the eighth position along a vertical direction (vertical mode+8 or mode 34).

The inter-color component prediction module 820 predicts a relationship between color components according to a color representation method and removes those parts showing correlation among color components, thereby improving an image encoding efficiency. In this case, the inter-color component prediction module 820 can carry out the inter-color component prediction by using a color representation method such as RGB, YUV, and YCbCr. Though this document describes the present invention through prediction between the luminance component (Y) and the chrominance component (U, V), the present invention is not limited to the example based on the YUV color space but can be applied to other color representation methods. For example, the present invention can be applied to the prediction between G and R, B component. Also, though the present invention is described with an example of color component data in the format of 4:4:4, the present invention can be equally applied to the chrominance component representation methods such as 4:2:2, 4:2:0, and 4:1:1.

More specifically, the inter-color component prediction module 820 can compare a residual block of a first color component with a residual block of a second color component obtained from the residual block acquisition module 810 and generate a residual signal which does not have a common color component. The 'comparing a residual block of a first color component with a residual block of a second color component and removing a common color component' of the inter-color component prediction module 820 can be called 'inter-color component prediction'. In other words, the inter-color component prediction module 820 delivers a residual signal from which a common color component has been removed through inter-color component prediction to a decoder; thus the image encoding apparatus 800 employing inter-color component prediction delivers only a small amount of data to a decoder; and accordingly, encoding performance can be improved. At this time, the residual signal can have the form of a block.

In what follows, for the convenience of description, the 'comparing a residual block of a first color component with a residual block of a second color component and removing a common color component' is terms as 'inter-color component prediction'.

At this time, the inter-color component prediction module 820 can predict the chrominance component based on the luminance component, and vice versa.

In one embodiment of the present invention, the inter-color component prediction module 820 can use residual blocks of luminance component for prediction of chrominance component. More specifically, the inter-color component prediction module 820 can predict chrominance component through Eq. 1 . The inter-color component prediction module 820 can generate a residual block of luminance component through a residual block of chrominance component; since a specific method for the inter-color component prediction module 820 to generate a residual block of luminance component can be implemented similarly to Eq. 1 below, detailed descriptions are not provided in this document.

$$\Delta r_C(x,y) = r_C(x,y) - (\alpha \times r_L(x,y)) \gg 3 \quad \text{[Eq. 1]}$$

In another embodiment of the present invention, the inter-color component prediction module 820 can use reconstructed residual blocks of luminance component for prediction of chrominance component. More specifically, the inter-color component prediction module 820 can predict chrominance component through Eq. 1 . The inter-color component prediction module 820 can generate a residual block of luminance component through a reconstructed residual block of chrominance component; since a specific method for the Inter-color component prediction module 820 to generate a residual block of luminance component can be implemented similarly to Eq. 1 below, detailed descriptions are not provided in this document.

$$\Delta r_C(x,y) = r_C(x,y) - (\alpha \times r'_L(x,y)) \gg 3 \quad \text{[Eq. 2]}$$

In Eqs. 1 and 2, $\Delta r_C$ represents a residual signal; rc represents a sample within a residual block of chrominance component; $r_L$ represents a sample within a residual block of luminance component; and $r'_L$ represents a samples within a reconstructed residual block of luminance component. Also, $\alpha$ represents a scaling factor, and (x, y) represents the position of a sample within a residual block.

In a yet another embodiment of the present invention, as expressed in Eqs. 1 and 2, the inter-color component prediction module 820, multiplies a residual block of luminance component (or a reconstructed residual block of luminance component) by a scaling factor, performs a right-shift computation on the multiplication result, and adds a residual block of chrominance component to the result of the right-shift computation, thereby generating a residual signal.

At this time, the scaling factor, an optimal value of which being included in a bitstream, can be delivered from an entropy encoding module to a decoder. As an example of a scaling factor, the scaling factor can have an integer value ranging from −8 to 8 . It should be noted, however, that the scaling factor is not limited to the aforementioned value but can assume various integer values. Also, the scaling factor can be chosen from a set of predetermined values.

In a still another embodiment of the present invention, in case the intra-prediction mode is the DM, the inter-color component prediction module 820 can predict a residual block of a different color component by using a residual block of a particular color component.

At this time, the inter-color component prediction module 820 can deliver information as to whether to generate a residual block of a second color component to a decoder by using a residual block of a first color component. The information as to whether to generate a residual block of a second color component can be generated in units of a transform unit, and the information as to whether to generate a residual block of a second color component can be included in a bitstream by the units of transform units and in the form of a flag. The scaling factor can be included in a bitstream in such a way that sign information and an absolute value of the scaling factor are separated from each other.

In case a predetermined condition is met, the inter-color component prediction module 820 can perform inter-color component prediction selectively. 1) The inter-color component prediction module 820 can perform inter-color component prediction selectively in case a coding unit, a prediction unit, or a transform unit is satisfied with a predetermined size. 2) The inter-color component prediction module 820 can perform inter-color component prediction selectively in case a particular prediction mode (intra- or inter mode) is satisfied. 3) The inter-color component prediction module 820 can perform inter-color component prediction selectively in case a particular intra prediction mode is satisfied. Also, the inter-color component prediction module 820 can perform inter-color component prediction selectively only when 4) a transform skip mode is used; the inter-color component prediction module 820 may perform inter-color component prediction selectively only when 5) lossless coding is performed.

As one example of the present invention, if the coding unit, prediction unit, or transform unit is satisfied with a predetermined size, the inter-color component prediction module 820 can perform selective inter-color component prediction.

The inter-color component prediction module 820 can perform selective inter-color component prediction only on the unit larger than a predetermined size and therefore, coding inefficiency due to increase of necessary bits for signaling a scaling factor when the size of the inter-color component prediction module 820 is too small can be avoided. As a specific example, the inter-color component prediction module 820 can perform prediction of a residual block of luminance component only on a transform unit larger than 8×8 size by using a residual block (or a reconstructed residual block of luminance component).

The inter-color component prediction module 820 can perform selective inter-color component prediction only on the unit smaller than a predetermined size and therefore, coding inefficiency that a scaling factor is applied to a large area when the size of the inter-color component prediction module 820 is excessively large can be avoided. As a specific example, the inter-color component prediction module 820 can perform prediction of chrominance component by using a residual block of luminance component (or a reconstructed residual block of luminance component) only on a coding unit smaller than 32×32 size.

The inter-color component prediction module 820 can perform selective inter-color component prediction by a unit or a block of a fixed size. As a specific example, the inter-color component prediction module 820 can perform prediction of chrominance component by using a residual block of luminance component (or a reconstructed residual block of luminance component) only on a transform unit of 4×4 size.

The inter-color component prediction module 820 can perform selective inter-color component prediction only when a coding unit has the smallest size.

The inter-color component prediction module 820 can perform selective inter-color component prediction only when a coding unit has the largest size.

The inter-color component prediction module 820 can perform selective inter-color component prediction only on the topmost transform unit.

The inter-color component prediction module 820 can perform selective inter-color component prediction only on the bottommost transform unit.

The size of a predetermined, particular unit can be determined beforehand by an encoder and a decoder. Also, the size of a predetermined, particular unit can use the size determined by high-level syntax such as a Sequence Parameter Set (SPS), Picture Parameter Set (PPS), and slice header.

The SPS is the syntax including a syntax element delivered at the level of a sequence unit, and the PPS refers to a parameter set expressing syntax at the level of a plurality of pictures. The slice header includes a PPS ID which a slice references, slice type, and information about a picture list which the slice references.

As another example of the present invention, the inter-color component prediction module 820 can perform selective inter-color prediction only for the case of a particular prediction mode (intra- or inter-mode).

The inter-color component prediction module 820 can perform selective prediction on a residual block of inter-color component only when the prediction mode of a coding unit is the intra-prediction mode.

The inter-color component prediction module 820 can perform selective prediction on a residual block of inter-color component only when the prediction mode of a coding unit is the inter-prediction mode.

As a yet another embodiment of the present invention, the inter-color component prediction module 820 can perform prediction with respect to a residual block of inter-color component selectively only for the case of a particular, intra prediction mode.

The inter-color component prediction module 820, to reduce computational complexity of an encoder and a decoder, can perform selective inter-color component prediction by using at least one of the planar mode, DC mode, horizontal mode, and vertical mode, all of which have relatively low computational complexity.

As a still another embodiment of the present invention, the inter-color component prediction module 820 can perform selective inter-color component prediction only for the case of transform skip mode.

As a further embodiment of the present invention, the inter-color component prediction module 820 can perform selective inter-color component prediction only when lossless coding is carried out.

The inter-color component prediction module 820 can be disposed after the transform module 830 and the quantization module 840. In other words, the inter-color component prediction module 820 can perform inter-color component prediction selectively in the frequency domain rather than a spatial domain.

The transform module 830 can transform a residual signal generated through inter-color component prediction by the inter-color component prediction module 820. More specifically, the transform module 830 transforms a signal in the spatial domain to a signal in the frequency domain with respect to a residual signal and generates transform coefficients.

The transform module 830 can perform transformation by using Discrete Cosine Transform (DCT) or Discrete Sine Transform (DST), and whether to use DCT or DST for transformation of a residual signal can be determined based on additional information. The additional information can be the prediction mode (intra- or inter-mode) of a prediction unit employed for generating a residual block, size of a transform signal, or a color component (luminance or chrominance signal).

The transform module 830 can skip a transformation process, which can be specified by transform skip. If the transform module 830 employs transform skip, a residual signal can be quantized immediately without performing a transformation process. An example of the transform skip by the transform module 830 is screen contents (for example, a document image or a presentation image of powerpoint), and a coding efficiency can be improved through the transform skip.

Meanwhile, the transform module 830 can perform lossless encoding of image data by skipping a transformation process even when the lossless encoding is employed.

The quantization module 840 quantizes transform coefficients transformed by the transform module 830 and generates a quantized transform coefficient level. At this time, the quantization module 840 can vary quantization level by using the quantization parameters; the quantization module 840 can apply step sizes different for the respective frequencies with respect to a transform coefficient by using a quantization matrix.

The quantization module 840 can encode image data without loss by skipping a quantization process in case lossless coding is employed.

The entropy encoding module 850 receives a symbol having various values and expresses the received symbol in the form of a decodable binary sequence or string by removing statistical redundancy. Here, a symbol refers to a syntax element to be encoded/decoded, a coding parameter, or a value of a residual block. A coding parameter is a parameter required for encoding and decoding, includes information that can be inferred during an encoding/decoding process as well as the information encoded by an encoder to be delivered to a decoder, such as the syntax element, and refers to the information necessary for encoding or decoding an image. For example, the coding parameter may include an intra/inter prediction mode, movement/motion vector, reference image index, quantization block pattern, presence of a residual signal, transform coefficients, quantized transform coefficients, quantized parameters, block size, block partition information, and statistical values.

A residual block may refer to a difference between an input block and a prediction block, a block formed from transformation of a difference between the input block and a prediction block, or a block formed from transformation and quantization of a difference between the input block and a prediction block.

More specifically, the entropy encoding can use CABAC entropy encoding, where the CABAC entropy encoding binarizes symbols into bins; determines a context model by using the encoding information of neighboring blocks and target blocks to be encoded or the information of a symbol/bin encoded in a previous step; predicts a probability of occurrence of bins according to the context model determined; and generates a bitstream by performing arithmetic encoding on the bins. After determination of the context model, the CABAC entropy encoding can update the context model by using the information of symbols/bins encoded for a context model of the next symbols/bins. Here, binarization refers to the process of expressing symbol values in the form of a binary series. A bin denotes a binary value (0 or 1) assigned to a symbol when it is expressed in the form of a binary series through binarization.

The entropy encoding module 850, having a flag within a PPS, signals a decoder as to whether an inter-color component prediction method is used within a picture.

The entropy encoding module 850 can signal the decoder as to whether the inter-color component prediction is employed by incorporating a flag in units of a CU or TU into a bitstream.

In case the entropy encoding module 850 uses CABAC, sign information of a scaling factor can be coded by bypass mode.

The entropy encoding module 850 can encode information related to the size of a particular unit (or block) into high-level syntax such as a Sequence Parameter Set (SPS), Picture Parameter Set (PPS), and slice header and signal the encoded information to the decoder.

Figure 9:
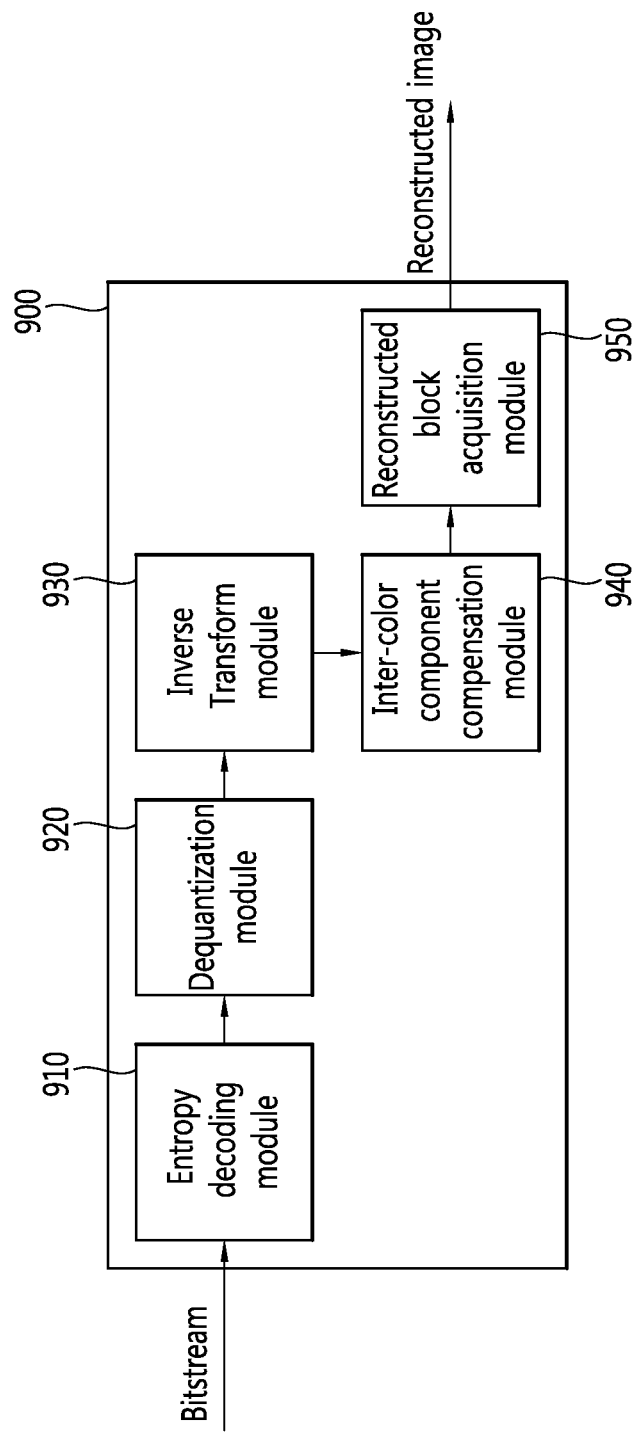
FIG. 9 is a block diagram of an image decoding apparatus which uses inter-color component compensation according to one embodiment of the present invention.

FIG. 9 is a block diagram of an image decoding apparatus which uses inter-color component compensation according to one embodiment of the present invention.

An image decoding apparatus 900 using inter-color component compensation comprises an entropy decoding module 910, a dequantization module 920, an inverse transform module 930, an inter-color component compensation module 940, and a reconstructed block acquisition module 950.

The image decoding apparatus 900 using inter-color component compensation may refer to the aforementioned image decoding apparatus 200. Therefore, the image decoding apparatus 900 using inter-color component compensation can carry out image decoding based on the intra- or inter-mode as described above. Also, an image decoding apparatus 900 using inter-color component prediction can carry out an inverse process of the image encoding apparatus 800 using inter-color component prediction as described above. Therefore, the following descriptions will not repeat what have been already described above.

The Entropy decoding module 910 receives a series of binary data and generates quantized data, which performs the inverse process of the Entropy encoding module 850 described above.

More specifically, the entropy decoding module 920 can carry out CABAC entropy decoding; CABAC entropy decoding receives bins corresponding to the respective syntax elements from a bitstream and determines a context model by using the syntax element to be decoded and decoding information of neighboring and target blocks to be decoded or the information of symbols/bins decoded in a previous step. At this time, the entropy decoding module 920 predicts a probability of occurrence of bins according to the context model determined and generates a symbol corresponding to the value of each syntax element by carrying out arithmetic decoding of the bins. After determination of the context model, the CABAC entropy decoding can update the context model by using the information of symbols/bins decoded for a context model of the next symbols/bins.

The entropy decoding module 910 decodes the information about whether a received picture uses inter-color component prediction by using a flag included in the PPS.

The entropy decoding module 910 can determine whether to use inter-color component prediction by decoding a flag in units of a CU or TU.

The entropy decoding module 910 can predict a scaling factor from the scaling factors of decoded blocks adjacent to a current block.

In case the entropy decoding module 910 uses CABAC, sign information of a scaling factor can be coded by bypass mode.

The entropy decoding module 910 can decode information related to the size of a particular unit (or block) from high-level syntax such as a Sequence Parameter Set (SPS), Picture Parameter Set (PPS), and slice header and signal the encoded information to the decoder.

The dequantization module 920 generating transform coefficient by performing dequantization of transform coefficient level based on a quantization parameter provided by the image encoding apparatus 800 which uses inter-color component prediction. Inverse quantization is also called scaling, which refers to a process of multiplying a transform coefficient level by a factor. Here, the dequantization module 920 performs an inverse process of the aforementioned quantization module 840, and in what follows, the descriptions common to the quantization module are not provided for the convenience of description.

In case an encoder uses lossless encoding, the dequantization module 920 may omit the inverse quantization process.

The inverse transform module 930 can generate reconstructed residual blocks by carrying out inverse transform with respect to the transform coefficients generated from the inverse quantization process. The inverse transform can perform inverse DCT and inverse DST corresponding respectively to the transform methods employed by the image encoding apparatus 800.

In case the image encoding apparatus 800 using inter-color component prediction employs lossless encoding, the inverse transform module 930 may skip the inverse transformation process.

In case the image encoding apparatus 800 using inter-color component prediction employs the transform skip mode, the inverse transform module 930 may skip the inverse transform process.

The inter-color component compensation module 940 corresponds to the inverse process of the inter-color component prediction module 820 described above. The inter-color component compensation module 940 can reconstruct a residual block of a second color component by adding a residual signal to the residual block of a first color component; in this case, a residual signal denotes the signal from which a common color component has been removed after a residual block of a first color component is compared with a residual block of a second color component as described above. In other words, the inter-color component compensation module 940 carries out inter-color component compensation by using a residual signal obtained through the inverse transform module 930 and a residual block of the first color component. At this time, the process of 'adding a residual signal to a residual block of a first color component' can be called 'inter-color component compensation', and in what follows, for the convenience of description, the process of 'adding a residual signal to a residual block of a first color component' is terms as 'inter-color component compensation'.

Since the inter-color component compensation module 940 corresponds to the inverse process of the inter-color component prediction module 820 described above, luminance component can be used as a first color component for compensation of chrominance component, and likewise, the inter-color component compensation module 940 can use chrominance component as a first color component for compensation of luminance component.

As one example of the present invention, the Inter-color component compensation module 940 can use a residual block of luminance component as shown in Eq. 3 for compensation of a residual block of chrominance component.

$$r'_C(x,y) = \Delta r'_C(x,y) - (\alpha \times r'_L(x,y)) \gg 3 \quad [\text{Eq. 3}]$$

In Eq. 3, $r'_C$ represents a sample within a reconstructed residual block of chrominance component generated through inter-color component compensation; $\Delta r'_C$ represents a sample within a residual signal; and $r'_L$ represents a sample within a reconstructed residual block of luminance component. Also, $\alpha$ represents a scaling factor, and (x, y) represents the position of a sample within a residual block.

As expressed by Eq. 3, the inter-color component compensation module 940 multiplies a reconstructed residual block of luminance component by a scaling factor, performs a right-shift computation on the multiplication result, and adds a residual signal of chrominance component to the result of the right-shift computation, thereby reconstructing a residual block of chrominance component. In other words, the inter-color component compensation module 940 can reconstruct a residual block of chrominance component through inter-color component compensation. The scaling factor can have an integer value ranging from −8 to 8. It should be noted, however, that the scaling factor is not limited to the aforementioned value but can assume various integer values. Also, the scaling factor can be chosen from a set of predetermined values, and an optimal value of the scaling factor can be decoded from a bitstream at the entropy decoding step.

As a different example of the present invention, in case the inter-prediction mode is the DM, the inter-color component compensation module 940 may use a reconstructed residual block of luminance component to generate a residual block of chrominance component. The inter-color component compensation module 940 can determine whether to apply inter-color component compensation by using a flag in units of a TU included in a bitstream. The scaling factor can be decoded through the sign value or the absolute value of the scaling factor.

Since the inter-color component compensation module 940 corresponds to the inverse process of the inter-color component prediction module 820 described above, if the inter-color component compensation module 940 satisfies a predetermined condition, inter-color component compensation can be carried out selectively. More specifically, 1) the inter-color component compensation module 940 can perform inter-color component compensation selectively in case a coding unit, a prediction unit, or a transform unit is satisfied with a predetermined size. 2) The inter-color component compensation module 940 can perform inter-color component compensation selectively in case a particular prediction mode (intra- or inter mode) is satisfied. 3) The inter-color component compensation module 940 can perform inter-color component compensation selectively in case a particular intra prediction mode is satisfied. Also, the inter-color component compensation module 940 can perform inter-color component compensation selectively only when 4) a transform skip mode is used; the inter-color component compensation module 940 may perform inter-color component compensation selectively only when 5) lossless coding is performed.

As described above, since the inter-color component compensation module 940 corresponds to the inverse process of the inter-color component prediction module 820, specific embodiments related to selective inter-color component compensation also correspond to the inverse process of the selective inter-color component prediction described above. Therefore, it 'encoding' in the embodiments of selective inter-color component prediction described above is replaced with 'decoding', one can obtain specific embodiments meant for selective inter-color component compensation performed by the inter-color component compensation module 940.

Up to this point, the term of 'inter-color component compensation' has been used for the convenience of describing the inter-color component compensation module 940. However, the 'inter-color component compensation' may refer to removing a common color component by comparing a residual block of a first color component with a residual block of a second color component. In other words, using the term of 'inter-color component compensation' does not exclude the case where the inter-color component compensation module 940 performs 'inter-color component prediction' from the technical scope defined by the appended claims.

The reconstructed block acquisition module 950 corresponds to the inverse process of the residual block acquisition module 960 described above. Therefore, as described in the residual block acquisition module 960 and FIG. 2, the reconstructed block acquisition module 950 can generate a prediction block by using prediction (or compensation) according to the inter- or inter-mode. The reconstructed block acquisition module 950 can generate a reconstructed block by adding a prediction block to the reconstructed residual block obtained from the inter-color component compensation module 940.

The reconstructed block acquisition module 950 can use at least one or more of the deblocking filter, SAO filter, and ALF for obtaining a reconstructed block.

Figure 10:
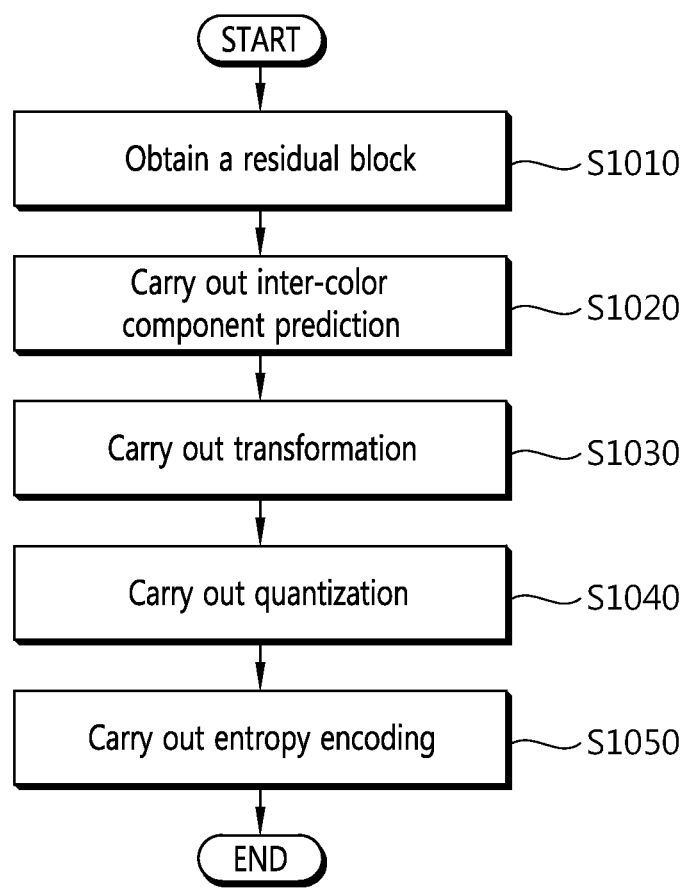
FIG. 10 is a flow diagram of an image encoding method which uses inter-color component prediction according to one embodiment of the present invention.

FIG. 10 is a flow diagram of an image encoding method which uses inter-color component prediction according to one embodiment of the present invention.

The image encoding apparatus 800 using inter-color component prediction generates a prediction block according to the intra- or inter-mode and obtains a residual block with respect to individual color components by using a difference between an input block of an input image and a prediction block generated S1010. The residual block with respect to individual color components can include a residual block with respect to a first color component and a residual block with respect to a second color component. In the following, a method for generating a residual block will be described in more detail.

The image encoding apparatus 800 using inter-color component prediction can perform inter-color component prediction by using a residual block generated S2010.

At this time, inter-color component prediction refers to the process for removing a common color component by comparing a residual block of the first color component with a residual block of the second color component. The image encoding apparatus using inter-color component prediction can generate a residual signal through inter-color component prediction. The inter-color component prediction method S1020 is the same as described in detail above.

The image encoding apparatus 800 using inter-color component prediction can carry out transform of a residual signal generated S1030. The method for carrying out transform is the same as described above.

The image encoding apparatus 800 using inter-color component prediction can carry out quantization of a transformed signal S1040. The specific process for quantization is the same as described above.

The image encoding apparatus 800 using inter-color component prediction can carry out entropy encoding of a quantized signal S1050. The specific process for entropy encoding is the same as described above.

Figure 11:
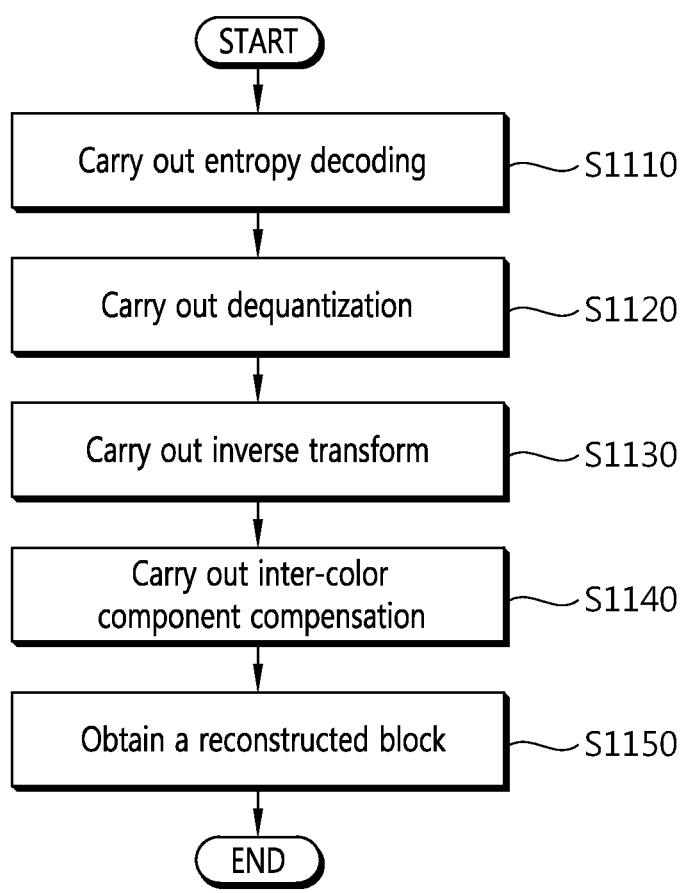
FIG. 11 is a flow diagram of an image decoding method which uses inter-color component compensation according to one embodiment of the present invention.

FIG. 11 is a flow diagram of an image decoding method which uses inter-color component compensation according to one embodiment of the present invention.

The image decoding apparatus 900 using inter-color component compensation can carry out entropy decoding by receiving a bitstream S1100. The entropy decoding refers to the process of generating quantized data by receiving a series of binary data, and the specific method for entropy decoding is the same as described above.

The image decoding apparatus 900 using inter-color component compensation can carry out dequantization by using the quantized data generated through the entropy decoding process S1120. The specific dequantization process is the same as described above.

The image decoding apparatus 900 using inter-color component compensation can carry out inverse transform by using the data generated through the dequantization process S1130. The specific inverse transform process is the same as described above.

The image decoding apparatus 900 using inter-color component compensation carries out inter-color component compensation by using a residual signal obtained through the inverse transform process and a residual block of a first color component S1140. The specific inter-color component compensation process is the same as described above.

The image decoding apparatus 900 using inter-color component compensation can obtain a reconstructed block by adding a residual block obtained through the inter-color component compensation to a prediction block s1150.

In the embodiments described above, the methods have been described by a series of steps or units based on a flow diagram; however, the present invention is not confined by the order of the steps, and some of the steps may be carried out in a different order from that described above or simultaneously with other steps. Also, it should be understood by those skilled in the art that the steps illustrated in the flow diagram are not exclusive; additional steps can be included; and one or more steps of the original flow diagram can be deleted without affecting the technical scope of the present invention.

The embodiments above include examples of various aspects. Though it is not possible to deal with all of the combinations illustrating the various aspects, it should be understood by those skilled in the art that those combinations other than described in this document are possible. Therefore, it will be apparent to those skilled in the art that various substitutions, modifications and variations can be made in the present invention without departing from the technical scope defined by the appended claims.

The method according to the present invention described above can be implemented in the form of a computer program and stored in a computer-readable recording medium. Examples of a computer-readable recording medium include ROM, RAM, CD-ROM, magnetic tape, floppy disk, optical data storage device, and implementation in the form of a carrier wave (for example, a transfer through the Internet).

The computer-readable recording medium may be distributed across computer systems connected to each other through a network, and computer-readable program codes may be stored and executed in a distributed manner. Functional programs, codes, and code segments for implementing the methods described above can be easily inferred by programmers skilled in the art to which the present invention belongs.

Though this document has described preferred embodiments of the present invention, the present invention is not limited to the particular embodiments described above; it should be understood that the present invention can be modified in various ways by those skilled in the art to which the present invention belongs without departing from the technical principles and scope defined by the appended claims. The modifications should not be understood separately from the technical principles or prospects of the present invention.

The present invention improves an image encoding/decoding efficiency by taking into account a correlation between color components.

Also, the present invention improves an image encoding efficiency by selectively carrying out inter-color component prediction.

Also, the present invention improves an image decoding efficiency by selectively carrying out inter-color component compensation.

What is claimed is:

1. An image decoding method carrying out inter-color component compensation, comprising:
   generating quantized data by receiving a bitstream;
   generating a transform coefficient from the quantized data;
   generating a residual signal from the transform coefficient;
   generating a residual block with respect to a second color component by modifying the residual signal using a residual block of a first color component; and
   obtaining a reconstructed block by adding a prediction block with respect to the second color component to the residual block with respect to the second color component,
   wherein the generating the residual block with respect to the second color component generates the residual block with respect to the second color component by modifying the residual signal using a value, corresponding to the residual block associated with the first color component, multiplied by a scaling factor, if a predetermined condition is satisfied,
   wherein the scaling factor is included in a transform unit in such a way that a sign value of the scaling factor and an absolute value of the scaling factor are separated from each other,
   wherein the scaling factor is encoded in consideration of whether the transform unit is larger than a predetermined size, and
   wherein the scaling factor is encoded in consideration of whether an intra prediction mode for the second color component is a derived mode in which a first intra prediction mode corresponding to the first color component is identical to a second intra prediction mode corresponding to the second color component when the intra prediction mode is used,
   wherein the number of intra prediction modes for the first color component is different from the number of intra prediction modes for the second color component,
   wherein the intra prediction modes for the first color component include two non-directional modes and 33 directional modes, and the intra prediction modes for the second color component include the two non-directional modes, a vertical mode, a horizontal mode and the derived mode,
   wherein the intra prediction modes for the first color component is labelled by 0, 1, . . . , 34 and the intra prediction modes for the second color component is labelled by 0, 1, . . . , 4,
   wherein the generating the residual block with respect to the second color component generates a compensation value using a right shift process for generating the residual block by adding the compensation value to the residual signal,
   wherein a bit number corresponding to the right shift process is larger than or equal to a base 2 logarithm of a horizontal size of the predetermined size.

2. The method of claim 1, wherein the predetermined condition is determined by a flag included in a Picture Parameter Set (PPS).

* * * * *